United States Patent Office 3,689,308
Patented Sept. 5, 1972

3,689,308
UNSATURATED POLYESTER-HYDROXY FUNCTIONAL, GRADED-RUBBER PAINT AND PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,476
Int. Cl. C08f 19/00, 43/08
U.S. Cl. 117—93.31                    15 Claims

ABSTRACT OF THE DISCLOSURE

A radiation-curable paint which on a pigment and particulate filler-free basis consists essentially of vinyl monomers and a unique, alpha-beta olefinically unsaturated, rubber-comprising resin formed by reacting an alpha-beta olefinically unsaturated mono (acyl chloride)-functional polyester with a hydroxy-functional graded-rubber particle. The dispersion is applied to substrates as a paint film and cured thereon by exposure to ionizing radiation, e.g. an electron beam.

THE INVENTION

A unique, rubber-comprising, radiation-curable paint is provided by preparing a film-forming dispersion of vinyl monomers and an alpha-beta olefinically unsaturated, rubber-comprising resin formed by reacting an alpha-beta olefinically unsaturated, mono (acyl chloride)-functional polyester with a hydroxy-functional, acrylic, graded-rubber particle. The dispersion is applied to substrates, e.g. wood, metal, glass, shaped polymeric solid, etc., as a paint film and cured thereon by ionizing radiation, preferably an electron beam having average energy in the range of about 100,000 to about 500,000 electron volts.

(I) The polyester reactant

The alpha-beta olefinically unsaturated mono (acyl chloride)-functional polyesters used in the preparation of the resinous component of the paints herein advantageously have average molecular weight in the range of about 1,000 to about 5,000, commonly in the range of about 1,500 to about 3,500. The polyester advantageously has about 0.5 to about 5, preferably about 0.7 to about 3.5 units of alpha-beta olefinic unsaturation per 1,000 units molecular weight.

These polyesters consist essentially of carbon, hydrogen and oxygen although they are terminated at one end by a carboxy halide, i.e. an acyl chloride group. Advantageously, such polyesters are prepared by first preparing a monocarboxy terminated polyester and reacting this with a suitable chloride group yielding compound, e.g. thionyl chloride, phosphorous trichloride, phosphorous pentachloride, etc., using heat and a pyridine catalyst.

The monocarboxy functional polyester can be prepared by conventional methods for producing polyesters and using as constituent monomers a monocarboxylic acid, maleic anhydride (or dicarboxylic acid or anhydride of equivalent olefinic unsaturation), a second anhydride wherein the anhydride group is supported by a ring structure, e.g. phthalic anhydride, and a polyhydric alcohol, e.g. propylene glycol.

The alpha-beta olefinic unsaturation of the polyester resin employed as a reactant in preparing the rubber-comprising resins used herein is derived from an alpha-beta olefinically unsaturated acid and/or anhydride constituent monomer, e.g. maleic, fumaric, itaconic, chloromaleic, dichloromaleic, etc.

The anhydride wherein the anhydride group is attached to a ring structure (aromatic or aliphatic) is selected from anhydrides that will not provide additional alpha-beta olefinic unsaturation units and the relative quantities of the two acids and/or anhydrides are adjusted to provide the desired concentration of such unsaturation. Suitable anhydrides for this purpose include, but not by way of limitation, phthalic, tetrahydrophthalic, cyclohexane dicarboxylic acid anhydride, nadich methyl anhydride, etc.

The polyhydric alcohol is preferably a diol consisting essentially of carbon, hydrogen and oxygen. Triols and other multihydric alcohols can be used but it is advisable to employ such alcohols in minor amounts with a diol, if they are used at all. Suitable diols include, but not by way of limitation, ethylene glycol, propylene glycol, 1,3-butylene glycol, 2-butene-1,4-diol, 1,4-butane glycol, 1,6-hexamethylene glycol, dimethylol benzenes, dihydroxy ethyl benzenes, etc.

(II) Preparation of the graded-rubber particle

The graded-rubber particle has a core of crosslinked, elastomeric, acrylic polymer, an outer shell comprising methyl methacrylate and a hydroxy-functional acrylate and an intermediate layer which is a copolymer of the monomers used to form the core and the monomers used to form the outer shell.

The process for preparing these particulate materials is at least a two-stage process. In one method of preparation, a major amount of mono-functional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and 89, percent complete, the second monomeric component, i.e., a mixture of about 65 to about 98, preferably about 70 to about 95, mole percent methyl methacrylate, and about 2 about 35, preferably about 5 to about 30 mole percent of a hydroxyalkyl acrylate or a mixture of about 2 to about 35, pre ferably about 5 to about 30 mole percent hydroxyalkyl acrylate and about 65 to about 98 mole percent of a monomer mixture selected from and consisting essentially of esters of acrylic or methacrylic acid and a $C_1$-$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20°–30° C. The terms "rubber-like" and "glass-like" are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or tri-functional monomer containing 2 or more non-conjugated terminal ethylenic groups. The monofunctional, alkyl, monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethylhexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6 hexamethylene dimethacrylate, 1,1,1 - trimethylolethane triacrylate, 1,1,1-trimethylolethane trimethacrylate, 1,1,1-trimethylolpropane triacrylate, 1,1,1-trimethlolpropane trimethacrylate, 1,4-dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a dieseter of acrylic or methacrylic acid and a $C_2$–$C_8$, preferably $C_2$–$C_6$, dihydric alcohol. In another embodiment, the crosslinking agent is a triester of acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the crosslinking agent.

In the second stage reaction, it is preferred to use a mixture of about 65 to about 98, preferably about 70 to about 95 percent methyl methacrylate and about 2 to about 35, preferably about 5 to about 30, mole percent of hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monoacrylates, e.g., esters of $C_2$–$C_8$ monohydric alcohols and either acrylic or methacrylic acid, or monofunctional vinyl hydrocarbons such as styrene methyl substituted styrenes, e.g. alpha methyl styrene, vinyl toluene, etc. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_8$, preferably $C_2$–$C_6$, dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part, such as a hydrocarbon group containing 8 or more carbon atoms, and a hydrophilic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate; sodium oleate; sodium alkyl aryl sulfonates; polyoxyethylene sulfates and phosphates; the ethylene oxide condensate with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures from about 40° C. to about 80° C., or at lower temperatures, as from 0° C. to 80° C. in the case of activated systems.

The graded-rubber particles above described and this method of preparation are disclosed by Ray A. Dickie and Seymour Newman in their patent application Ser. No. 100,464 filed of even date with this application.

In another method of preparation, hereinafter illustrated, the rubber particles are formed in an aliphatic hydrocarbon medium.

(III) Vinyl monomers employed in the paint dispersion

The paint binder dispersion advantageously contains about 20 to about 80, preferably about 25 to about 75, weight percent vinyl monomers and about 20 to about 80, preferably about 25 to about 75, weight percent of the polymeric component, i.e. the alpha-beta olefinically unsaturated, rubber-comprising resin formed by reacting the aforedescribed alpha-beta olefinically unsaturated, mono (acyl chloride)-functional polyester with the aforedescribed hydroxy-functional, acrylic, graded-rubber particle. Obviously, the polymeric component may also contain other alpha-beta olefinically unsaturated resins such as those disclosed in U.S. Pats. 3,437,512, 3,437,513, 3,437,514 and 3,509,234.

Monomer type and concentration provide one means for adjusting the viscosity of the paint dispersion to conform to the methods of application desired, e.g., spray coating, roll coating, etc. In functional terms, the amount of vinyl monomer present is at least sufficient to convert the alpha-beta olefinically unsaturated, rubber-comprising resin into a crosslinked continuous coating on the surface of a substrate when a film of such coating dispersion is exposed to ionizing radiation, e.g., electron beam.

Vinyl monomers employed may be monofunctional, monoacrylates formed by the esterification of acrylic or methacrylic acid and a $C_1$–$C_8$, preferably a $C_1$–$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent, of diacrylates, e.g., the diesters of acrylic or methacrylic acid and a $C_2$–$C_6$ diol such as 1,3-butylene diacrylate, 1,3-butylene dimethacrylate, 1,6-hexamethylene diacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$-$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(IV) Preparation and application of the coating dispersion to a substrate

By adjusting the viscosity of the coating dispersion to a viscosity compatible with the desired method of coating, these coatings may be applied by any of the conventional methods, e.g. brushing, spraying, roll coating, curtain coating, flow coating, etc.

The viscosity of the paint binder solution may be adjusted by varying the molecular weight of the alpha-beta olefinically unsaturated, rubber-comprising resin. This may be accomplished by controlling the average number of functional groups per graded-rubber particle by controlling the concentration of hydroxyl bearing monomer in the outer shell, particularly in the final portion of the monomer mixture introduced into the reaction medium when the graded-rubber particle is produced. The viscosity may also be regulated by varying the relative concentration of the resin component with respect to the vinyl monomer component and/or by varying the relative concentrations of dissimilar monomers within the vinyl monomer component. The binder dispersion may be applied to the substrate essentially free of non-polymerizable, organic solvents and/or diluents or it may be applied with the solvent and/or diluents in a method of application wherein the solvents and/or diluents are flashed off prior to polymerization.

Coatings may be applied to any substrate, e.g., metal, wood, glass, polymeric solids, etc. These coatings will ordinarily be applied to an average depth in the range of about 0.1 to about 4 mils, more commonly about 0.5 to about 2 mils.

(V) Curing the coatings

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second on a workpiece, preferably a moving workpiece, with the coating receiving a total dose in the range of about 1 to about 25, commonly about 8 to about 15 mrad.

The term "ionizing radiation" as employed herein means radiation having sufficient energy to remove an electron from a gas atom, forming an ion, hence radiation with minimum energy of, or equivalent to, at least about 5,000 electron volts except when the curing is carried out in a vacuum. The preferred method of curing films of the instant paint binders on the substrates to which they have been applied is by subjecting such films to a beam of polymerization effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder, which is ultimately converted to a durable film resistant to wear, weather, etc, can be all or virtually all that is used to form the film or it can be a vehicle for pigmentary and/or mineral filler material.

The abbreviation "mrad" as employed herein means one million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about 1/8 inch in diameter at this point, is then scanned in one direction to make a fan-shaped beam and then passed through a metal window, e.g., aluminum, aluminum-copper alloy, or magnesium-thorium alloy of about 0.003 inch thickness. This invention will be more fully understood from the following examples:

EXAMPLE 1

(I) Preparation of the graded-rubber particles

Graded-rubber particles are prepared in aqueous medium using the following procedures: To 1,000 parts by weight water which has been boiled and cooled to room temperature under a nitrogen atmosphere are added 2.86 parts by weight sodium dodecyl sulfate dissolved in 35.7 parts by weight water and about 1/8 of a monomer mixture consisting of 890 parts butyl acrylate and 80 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is begun at a rate such that the temperature of the reaction mixture is maintained at 47° to 50° During the addition of the last two thirds of the first monomer mixture, 5.72 parts by weight sodium dodecyl sulfate dissolved in 35.7 parts by weight water are added at a substantially constant rate. The reaction mixture is maintained at about 47° to 50° C. for about 60 minutes prior to beginning simultaneous dropwise addition of a mixture of 780 parts by weight methyl methacrylate and 425 parts by weight hydroxyethyl methacrylate, 30 parts by weight dodecyl mercaptan, and 2.86 parts by weight sodium dodecyl sulfate dissolved in 35.7 parts by weight water. This addition, which requires about 30 minutes, is carried out at a rate such that the temperature of the reaction mixture is maintained at about 47° to 50° C. Following this addition, the mixture is maintained at 47° to 49° C. for an additional two hours. The emulsion is then coagulated by addition of 20 grams of concentrated hydrochloric acid solution and 100 ml. of water. The rubber particles are isolated by filtration and washed with methanol containing 1 weight percent of hydrochloric acid. The particles are then dried.

(II) Determination of hydroxyl concentration

Determination of the concentration of the reactive hydroxyl groups in the shell of the graded-rubber particles is made by the well known method of analysis wherein the hydroxy groups are reacted with acetic anhydride using a pyridine catalyst. The acetic acid produced is then back titrated with sodium hydroxide. For details reference is made to A. Steyermark, Quantitative Organic Analysis, pp. 302–303, published by Blakiston Company, New York, Toronto, and Philadelphia (1951).

(III) Preparation of polyester

An alpha-beta olefinically unsaturated, mono (acyl chloride)-functional polyester is prepared by the following method using the materials hereinafter set forth:

(A) Preparation of monocarboxy terminated polyester:

| Materials: | Parts by wt. |
|---|---|
| Phthalic anhydride | 299.20 |
| Maleic anhydride | 98.06 |
| Propylene glycol | 229.80 |

Procedure: The above listed monomers with 0.5 weight percent (basis total monomers) dibutyl tin oxide are charged to a 3-necked flask fitted with stirrer, condenser and nitrogen inlet. The mixture is heated to 180° C. and 13 weight percent (basis monomer charge) stearic acid is added. The temperature is then raised to 200° C. and glycol and water are distilled off until the carboxyl to hydroxyl number ratio is about 25 and the carboxyl number is in the range of about 25 to about 37 which corresponds to a molecular weight of 1500–2200 (carboxyl and hydroxyl numbers are determined by titration and the molecular weight is calculated therefrom as described in "Preparative Method of Polymer Chemistry" by W. R. Sorenson and T. W. Campbell, Interscience Publishers, New York, N.Y., U.S.A. (1961) at page 134.

(B) Preparation of the mono (acryl chloride) polyester—The unsaturated monocarboxy polyester thus obtained is used for preparation of the corresponding acyl chloride using the following procedure:

To the unsaturated monocarboxy polyester prepared above is added 1 weight percent of pyridine and the temperature is maintained at 80°–85° C. Then 8 weight percent of thionyl chloride is added over a period of 3 hours. The temperature is then raised to 120° C. and maintained for 2 hours. Dry nitrogen gas is then bubbled through the mass for 30 minutes. The acyl chloride thus obtained is protected from moisture.

(IV) Reaction of acyl chloride with hydroxy-functional graded-rubber particles

To the acyl chloride thus obtained in III is added 600 parts of methyl methacrylate. The contents are stirred under nitrogen and 0.5 weight percent of hydroquinone is added. To this mixture is added 218 g. of hydroxy-functional rubber particles from I above, i.e. in an amount such that there is provided in the resultant reaction mix about 1 mole of carboxy acid chloride polyester per mole of reactive hydroxyl groups of the graded-rubber particles. The rubber particles are added with 90 parts by weight methyl methacrylate. This reaction mixture is maintained at 70°–75° C. for 5 hours.

The reaction product is further diluted with methyl methacrylate until the methyl methacrylate content of the dispersion is about 65 weight percent.

(V) Coating of substrate

This dispersion, which is now ready for pigmentation, if desired, is applied to the substrate surfaces i.e., wood, metal, glass, and shaped polymeric solid (acrylonitrile-butadiene-styrene copolymer) to the average depth of about 0.7 mil (0.0007 inch) and cured by exposure to electron beam radiation.

The conditions of irradiation are as follows:

Potential—275 kv.
Current—30 ma.
Distance, emitter to workpiece—10 in.
Dose—10–15 mrad
Atmosphere—nitrogen

EXAMPLE 2

(I) Preparation of the graded-rubber particles

Graded-rubber particles having hydroxy functionality are prepared as in Example 1 with changes in the composition of the core and of the outer shell. In the core, an equimolar amount of 1,3-butylene diacrylate is substituted for the 1,3-butylene dimethacrylate and an equimolar amount of 2-ethyl hexyl acrylate is substituted for the butyl acrylate. The outer shell is formed from a mixture of monomers consisting of 40 mole percent methyl methacrylate, 20 mole percent hydroxypropyl acrylate, 5 mole percent ethyl acrylate, 5 mole percent butyl acrylate, 5 mole percent butyl methacrylate, 5 mole percent 2-ethyl hexyl arcylate, 5 mole percent styrene, 5 mole percent vinyl toluene, 5 mole percent 1,3-butylene diacrylate, and 5 mole percent divinyl benzene. This monomer mixture excluding the hydroxypropyl acrylate and methyl methacrylate is divided into three equal portions. The first two portions are added slowly to the reaction mixture. The third portion is mixed with the hydroxypropyl acrylate and methyl methacrylate and added last.

(II) Determination of hydroxyl concentration

Determination of the concentration of the reactive hydroxyl groups on the surfaces of the particles is carried out using the method described in Example 1.

(III) Preparation of polyester

An alpha-beta olefinically unsaturated, mono (acyl chloride)-functional polyester is prepared by the following method using the materials hereinafter set forth:

A. Preparation of monocarboxyl terminated polyester

| Materials | Parts by weight | Moles |
|---|---|---|
| Phthalic anhydride | 299.20 | 2.02 |
| Maleic anhydride | 98.06 | 1.0 |
| Propylene glycol | 229.80 | 3.02 |

Procedure: The above listed monomers with 0.5 weight percent (basis total monomers) dibutyl tin oxide are charged to a 3-necked flask fitted with stirrer, condenser and nitrogen inlet. The mixture is heated to 180° C. for 2 hours. The temperature is then raised to 200° C. and water and propylene glycol are distilled off slowly. During this process, samples of polyester are taken and analyzed for their carboxyl and hydroxyl numbers using the same method used in Example 1. The distillation is stopped when the ratio of carboxyl number to hydroxyl number is about 30 and the carboxyl number is between about 26 and 38. The number average molecular weight of the polyester is calculated from hydroxyl and carboxyl number (method described in aforecited publication of Sorenson and Campbell at page 134) is in the range of about 1500 to about 2500.

The polyester at this stage is a linear polymer terminated with carboxyl groups, i.e., it has an average of nearly two carboxyl groups per polyester chain.

To the reaction mixture is added 8 weight percent (basis total charge in flask) of diethylene glycol monoethyl ether, also called 2-(2-ethoxyethoxy)-ethanol. Heating is continued at 200° C. until the carboxyl number of the polyester is reduced by about 50%. The mixture is then cooled to 80°–85° C. and used directly for the next step for the conversion to acyl chloride.

(B) Preparation of the mono (acyl chloride) polyester—The procedure used for this reaction step in Example 1 is repeated.

(IV) Reaction of acyl chloride with hydroxy-functional graded-rubber particles

The procedure used for this reaction step in Example 1 is repeated.

(V) Coating of the substrate

The procedure used for application and curing in Example 1 is repeated.

EXAMPLE 3

The procedures of Examples 1 and 2 are repeated with the difference that a vinyl monomer mixture consisting of 2 molar parts methyl methacrylate, 1 molar part ethyl acrylate and 1 molar part 2-ethyl hexyl acrylate is substituted for the methyl methacrylate component of the paint.

EXAMPLE 4

The procedures of Examples 1 and 2 are repeated with the difference that a vinyl monomer mixture consisting of 2 molar parts methyl methacrylate, 1 molar part methyl styrene and 1 molar part butyl acrylate is substituted for the methyl methacrylate component of the paint.

EXAMPLE 5

The procedures of Examples 1 and 2 are repeated with the difference that a vinyl monomer mixture consisting of 2 molar parts styrene, 1 molar part 1,3-butylene dimethacrylate, 1 molar part butyl methacrylate, and 1 molar part methyl methacrylate are substituted for the methyl methacrylate component of the paint.

EXAMPLE 6

The procedures of Examples 1 and 2 are repeated with the difference that a vinyl monomer mixture consisting of 2 molar parts methyl methacrylate, 1 molar part styrene, 1 molar part glycidyl methacrylate and 1 molar part divinyl benzene is substituted for the methyl methacrylate component of the paint.

EXAMPLE 7

The procedures of Examples 1 and 2 are repeated with the difference that the alpha-beta olefinically unsaturated graded rubber is prepared using 0.75 mole of the mono (acyl chloride) polyester per mole of reactive hydroxyl on the hydroxy-functional graded-rubber particles.

EXAMPLE 8

The procedures of Examples 1 and 2 are repeated with the difference that the alpha-beta olefinically unsaturated graded rubber is prepared using 0.5 mole of the mono (acyl chloride) polyester per mole of reactive hydroxyl on the hydroxy-functional graded-rubber particles.

EXAMPLE 9

The procedures of Examples 1 and 2 are repeated with the difference that the monocarboxy polyester is prepared from the following monomers:

| Materials: | Parts by wt. |
|---|---|
| Phthalic anhydride | 149.60 |
| Maleic anhydride | 98.06 |
| Propylene glycol | 153.70 |
| Stearic acid | 40.0 |

EXAMPLE 10

The procedures of Examples 1 and 2 are repeated with the difference that the monocarboxy polyester is prepared from the following monomers:

| Materials: | Parts by wt. |
|---|---|
| Phthalic anhydride | 88.90 |
| Maleic anhydride | 98.06 |
| Propylene glycol | 121.80 |
| Octanoic acid | 22.0 |

EXAMPLE 11

The procedures of Examples 1 and 2 are repeated except for the difference that the monocarboxy polyester is prepared from the following monomers:

| Materials: | Parts by wt. |
|---|---|
| Cyclohexane dicarboxylic acid anhydride | 308.3 |
| Maleic anhydride | 98.1 |
| Propylene glycol | 228.3 |
| Lauric acid | 63.0 |

EXAMPLE 12

The procedures of Examples 1 and 2 are repeated except for the difference that the monocarboxylic polyester is prepared from the following monomers:

| Materials: | Parts by wt. |
|---|---|
| Cyclohexane dicarboxylic acid anhydride | 154.2 |
| Maleic anhydride | 98.1 |
| Propylene glycol | 152.2 |
| Stearic acid | 52.0 |

EXAMPLE 13

The procedures of Examples 1 and 2 are repeated except for the difference that the monocarboxylic polyester is prepared from the following monomers:

| Materials: | Parts by wt. |
|---|---|
| Tetrahydrophthalic anhydride | 304.3 |
| Maleic anhydride | 98.1 |
| Propylene glycol | 152.2 |
| Stearic acid | 72.0 |

EXAMPLE 14

The procedures of Examples 1 and 2 are repeated except for the difference that the monocarboxylic polyester is prepared from the following monomers:

| Materials: | Parts by wt. |
|---|---|
| Dodecyl succinic anhydride | 536.8 |
| Maleic anhydride | 98.1 |
| Propylene glycol | 228.3 |
| Sstearic acid | 102.0 |

EXAMPLE 15

The procedures of Examples 1 and 2 are repeated except for the difference that the monocarboxylic polyester is prepared from the following monomers:

| Materials: | Parts by wt. |
|---|---|
| Dodecyl succinic anhydride | 268.4 |
| Maleic anhydride | 98.1 |
| Polypropylene glycol | 152.2 |
| Stearic acid | 58.8 |

EXAMPLE 16

The procedures of Examples 1 and 2 are repeated except for the difference that the monocarboxylic polyester is prepared from the following monomers:

| Materials: | Parts by wt. |
|---|---|
| Phthalic anhydride | 299.2 |
| Itaconic anhydride | 112.1 |
| Propylene glycol | 229.8 |
| Stearic acid | 83.2 |

EXAMPLE 17

The procedures of Examples 1 and 2 are repeated except for the difference that an equimolar amount of fumaric acid is substituted for the maleic anhydride in the preparation of the monocarboxy polyester.

EXAMPLE 18

The procedures of Examples 1 and 2 are repeated except for the difference that an equimolar amount of neopentyl glycol is substituted for the propylene glycol in the preparation of the monocarboxy polyester.

EXAMPLE 19

The procedures of Examples 1 and 2 are repeated except for the difference that an equimolar amount of ethylene glycol is substituted for the propylene glycol in the preparation of the moncarboxy polyester.

EXAMPLE 20

The procedures of Examples 1 and 2 are repeated except for the difference that an equimolar amount of 2-butene-1,4-diol is substituted for the propylene glycol in the preparation of the monocarboxy polyester.

EXAMPLE 21

The procedures of Examples 1 and 2 are repeated except for the difference that an equimolar amount of 1,6-hexamethylene glycol is substituted for the propylene glycol in the preparation of the monocarboxy polyester.

EXAMPLE 22

The procedures of Examples 1 and 2 are repeated except for the difference that an equimolar amount of 1,2-propanediol dial is substituted for the propylene glycol in the preparation of the monocarboxy polyester.

EXAMPLE 23

The procedures of Examples 1 and 2 are repeated except for the preparation of the hydroxy-functional graded-rubber particles. The core of the particles is formed from about 85 mole percent butyl acrylate and about 15 mole percent divinyl benzene, and the outer shell is formed from a monomer mixture consisting of 30 mole percent methyl methacrylate, 15 mole percent alpha methyl styrene, 10 mole percent ethyl acrylate, 10 mole percent acrylonitrile, 10 mole percent methacrylonitrile, 10 mole percent butyl methacrylate, 5 mole percent vinyl acetate and 10 mole percent hydroxyethyl acrylate. The monomers used to form the outer shell excepting the hydroxyethyl acrylate are divided into three portions. After the first two portions are slowly added to the reaction mixture, the final portion is mixed with the hydroxyethyl acrylate and added dropwise to the reaction mixture.

EXAMPLE 24

The procedures of Examples 1 and 2 are repeated except for the preparation of the hydroxy-functional graded-rubber particles. The core of the particles is formed from about 90 mole percent ethyl acrylate and about 10 mole percent of 1,1,1-trimethylolpropane trimethacrylate.

EXAMPLE 25

The procedures of Examples 1 and 2 are repeated except for the preparation of the hydroxy-functional graded-rubber particles. The core of the particles is formed from about 90 mole percent 2-ethyl hexyl acrylate and about 10 mole percent of 1,4-dimethylolcyclohexane dimethacrylate.

EXAMPLE 26

The procedures of Examples 1 and 2 are repeated except for the preparation of the hydroxy-functional graded-rubber particles. The core of the particles is formed from about 90 mole percent butyl acrylate and about 10 mole percent divinyl benzene.

EXAMPLE 27

The procedures of Examples 1 and 2 are repeated except for the difference that the curing of the coatings upon the substrates is carried out using an electron beam having an average potential of about 260,000 electron volts.

EXAMPLE 28

The procedures of Examples 1 and 2 are repeated except for the differences that the curing of the coatings upon the substrates is carried out using a helium atmosphere and an electron beam having an average potential of about 150,000 electron volts.

EXAMPLE 29

The procedures of Examples 1 and 2 are repeated except for the differences that the curing of the coating upon the substrates is carried out using an atmosphere comprising a major amount of nitrogen and a minor amount of carbon dioxide and an electron beam having an average potential of about 325,000 electron volts.

EXAMPLE 30

The procedures of Examples 1 and 2 are repeated with the differences that the coating dispersion consists essentially of 80 parts by weight of the alpha-beta olefinically unsaturated polyester and graded-rubber reaction product and about 20 parts by weight of vinyl monomers. The vinyl monomers are a mixture of equimolar amounts of methyl methacrylate and styrene.

EXAMPLE 31

The procedures of Examples 1 and 2 are repeated with the differences that the coating dispersion consists essentially of 70 parts by weight of the alpha-beta olefinically unsaturated polyester and graded-rubber reaction product and about 30 parts by weight of vinyl monomers. The vinyl monomers are a mixture of 30 mole percent methyl methacrylate, 20 mole percent styrene, 20 mole percent ethyl acrylate, 10 mole percent acrylonitrile, 10 mole percent methacrylonitrile and 10 mole percent 1,3-butylene diacrylate.

EXAMPLE 32

The procedures of Examples 1 and 2 are repeated with the differences that the coating dispersion consists essentially of 50 parts by weight of the alpha-beta olefinically unsaturated polyester and graded-rubber reaction product and about 50 parts by weight of vinyl monomers. The vinyl monomers are a mixture of 50 mole percent styrene, 30 mole percent methyl methacrylate, 20 mole percent butyl methacrylate and 10 mole percent 1,4-dimethylolcyclohexane dimethacrylate.

EXAMPLE 33

The procedures of Examples 1 and 2 are repeated with the difference that the coating dispersion consists essentially of 20 parts by weight of the alpha-beta olefinically unsaturated polyester and graded-rubber reaction product and about 80 parts by weight of vinyl monomers. The vinyl monomers are a mixture of 85 mole percent methyl methacrylate and 15 mole percent divinyl benzene.

EXAMPLE 34

The procedure of Examples 1 and 2 are repeated with the difference that the hydroxy-functional graded-rubber particles are prepared in the following manner:

(A) A mixture is formed from the following:

| Materials: | Grams |
|---|---|
| Ethyl acrylate | 80.0 |
| 1,3-butylene dimethacrylate | 20.0 |
| Dispersing agent[1] | 3.0 |
| AIBN[2] | 1.0 |

[1] An amphipatic copolymer (1 portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using AIBN initiator (9 g.) and butyl acetate solvent. This method of producing this dispersing agent is described in detail by K. E. J. Barratt and H .R. Thomas, Journal of Polymer Science, Part A-1, vol. 7, 2625 (1969). Other dispersing agents which are effective for stabilizing suspension in hydrocarbon liquids may be used in place of the above decribed material.
[2] 2,2′ azobis-(2-methyl propionitrile).

(B) The mixture of the above listed material is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
| --- | --- |
| Methyl methacrylate | 320.0 |
| Hydroxyethyl methacrylate | 80.0 |
| Dispersing agent[1] | 3.0 |
| AIBN | 6.0 |
| n-Dodecane | 1000.0 |

[1] Same as in (A) above.

The terms "acrylate" and "acrylates," when used herein without a modifier distinguishing between esters of acrylic acid and methacrylic acid, shall be understood to include both. This, of course, does not apply to a naming of a specific compound.

It will be understood by those skilled in the art that modifications can be made within the foregoing examples in the scope of this invention as hereinbefore described and hereinafter claimed.

We claim:

1. A radiation-curable paint which on a pigment and mineral filler-free basis comprises a film-forming dispersion of about 80 to about 20 weight percent vinyl monomers and about 20 to about 80 weight percent of a polymeric component consisting essentially of the product formed by reacting about 0.25 to about 1 molar part of an alpha-beta olefinically unsaturated, mono (acyl chloride) terminated polyester with one molar part of a hydroxy-functional particle of graded rubber, said polyester being derived from at least one monocarboxylic acid, at least one dicarboxylic acid or anhydride thereof and at least one polyhydric alcohol, said molar part of a hydroxy-functional particle of graded-rubber being measured by and equivalent to one molar part of reactive hydroxyl groups on the surfaces thereof, said particle of graded-rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups, said minor and crosslinking amount not exceeding about 20 mole percent of the constituent monomers of the crosslinked acrylic polymer, and (b) a remainder consisting essentially of a monoester of acrylic acid and a $C_2$–$C_8$ monohydric alcohol, said remainder constituting at a minimum about 80 mole percent of the constituent monomers of the crosslinked acrylic polymer, and (2) about 90 to about 10 weight percent of an outer shell having glass transmission temperature above that of said core and consisting essentially of the polymerization product of mixtures selected from the group consisting of (a) about 65 to about 98 mole percent methyl methacrylate and about 2 to about 35 mole percent of a hydroxyalkyl acrylate, and (b) about 2 to about 35 mole percent of a hydroxyalkyl acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_8$ dihydric alcohol and 0 to 30 mole percent of a monomer selected from acrylonitrile, methacrylonitrile and vinyl acetate.

2. A paint in accordance with claim 1 wherein said core is crosslinked acrylic polymer consisting essentially of 2-ethyl hexyl acrylate and a diacrylate selected from 1,3-butylene diacrylate and 1,3-butylene dimethacrylate.

3. A paint in accordance with claim 1 wherein said graded-rubber particles have average diameter in the range of about 0.04 to about 1 micron.

4. A paint in accordance with claim 1 wherein said minor and crosslinking amount constitutes about 2 to about 20 mole perecnt of said core and said remainder constitutes about 98 to about 80 mole percent of said core.

5. A paint in accordance with claim 1 wherein said vinyl monomers are selected from esters of acrylic and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol, and diesters of methacrylic acid and a $C_2$–$C_8$ dihydric alcohol.

6. A paint in accordance with claim 1 wherein said outer shell has glass transition temperature at least 50° C. above that of said core.

7. The method of coating a substrate which comprises:
(A) applying to a surface of said substrate a film of radiation-curable paint which on a pigment and mineral filler-free basis comprises a film-forming dispersion of about 20 to about 80 weight percent of vinyl monomers and about 80 to about 20 weight percent of a polymeric component formed by reacting about 0.25 to about 1 molar part of an alpha-beta olefinically unsaturated, mono (acyl chloride) terminated polyester with one molar part of a hydroxy-functional particle of graded-rubber, said polyester being derived from at least one monocarboxylic acid, at least one dicarboxylic acid or anhydride thereof and at least one polyhydric alcohol, said one molar part of a hydroxy-functional particle of graded-rubber being measured by and equivalent to one molar part of reactive hydroxyl groups on the surfaces thereof, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups, said minor and crosslinking amount not exceeding about 20 mole percent of the constituent monomers of the crosslinked acrylic polymer, and (b) a remainder consisting essentially of a monoester of acrylic acid and $C_2$–$C_8$ monohydric alcohol, said remainder constituting at a minimum about 80 mole percent of the constituent monomers of the crosslinked acrylic polymer, and (2) about 90 to about 10 weight percent of an outer shell having glass transmission temperature above that of said core and consisting essentially of the polymerization product of mixtures selected from the group consisting of (a) about 65 to about 98 mole percent methyl methacrylate and about 2 to about 35 mole percent of a hydroxyalkyl acrylate, and (b) about 2 to about 35 mole percent of a hydroxyalkyl acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_8$ dihydric alcohol and 0 to 30 mole percent of a monomer selected from acrylonitrile, methacrylonitrile and vinyl acetate, and (B) crosslinking said film upon said substrate by exposing said film to a beam of electrons having average energy in the range of about 100,000 to about 500,000 electron volts.

8. The method of claim 7 wherein said hydroxyalkyl acrylate is selected from hydroxyethyl acrylate, hydroxypropyl acrylate, hydroxyethyl methacrylate and hydroxypropyl methacrylate.

9. The method of claim 7 wherein said core is crosslinked acrylic polymer consisting essentially of butyl acrylate and a diacrylate selected from 1,3-butylene diacrylate and 1,3-butylene dimethacrylate.

10. The method of claim 7 wherein said core is crosslinked acrylic polymer consisting essentially of 2-ethyl hexyl acrylate and a diacrylate selected from 1,3-butylene diacrylate and 1,4-butylene dimethacrylate.

11. The method of claim 7 wherein said graded-rubber particles have average diameter in the range of about 0.1 to about 0.2 micron.

12. The method of claim 7 wherein said minor and crosslinking amount constitutes about 2 to about 20 mole percent of said core and said remainder constitutes about 98 to about 80 mole percent of said core.

13. The method of claim 7 wherein said vinyl monomers are selected from esters of acrylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol, and diesters of methacrylic acid and a $C_2$–$C_8$ dihydric alcohol.

14. The method of claim 7 wherein said outer shell has glass transition temperature at least 50° C. above that of said core.

15. An article of manufacture comprising in combination a substrate and a coating thereon comprising the polymerization product of a film-forming dispersion on a pigment and particulate filler-free basis consisting essentially of about 20 to about 80 weight percent vinyl monomers at least the major proportion of which is selected from esters of acrylic or methacrylic acid and a $C_1$–$C_8$ monohydric alcohol and $C_8$–$C_9$ monovinyl hydrocarbons and about 20 to about 80 weight percent of a polymeric component consisting essentially of the product formed by reacting about 0.25 to about 1 molar part of an alpha-beta olefinically unsaturated, mono (acyl chloride) terminated polyester with one molar part of a hydroxy-functional particle of graded-rubber, said polyester being derived from at least one monocarboxylic acid, at least one dicarboxylic acid or anhydride thereof and at least one polyhydric alcohol, said molar part of a hydroxy-functional particle of graded-rubber being measured by and equivalent to one molar part of reactive hydroxyl groups on the surfaces thereof, said particle of graded-rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups, said minor and crosslinking amount not exceeding about 20 mole percent of the constituent monomers of the crosslinked acrylic polymer, and (b) a remainder consisting essentially of a monoester of acrylic acid and a $C_2$–$C_8$ monohydric alcohol, said remainder constituting at a minimum about 80 mole percent of the constituent monomers of the crosslinked acrylic polymer, and (2) about 90 to about 10 weight percent of an outer shell having glass transmission temperature above that of said core and consisting essentially of the polymerization product of mixtures selected from the group consisting of (a) about 65 to about 98 mole percent methyl methacrylate and about 2 to about 35 mole percent of a hydroxyalkyl acrylate, and (b) about 2 to about 35 mole percent of a hydroxyalkyl acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_8$ dihydric alcohol and 0 to 30 mole percent of a monomer selected from acrylonitrile, methacrylonitrile and vinyl acetate.

References Cited

UNITED STATES PATENTS

| | | | |
|---|---|---|---|
| 3,423,481 | 1/1969 | Mizutani | 260—836 |
| 3,437,514 | 4/1969 | Burlant | 260—872 |
| 3,450,796 | 6/1969 | Griffin | 260—885 |
| 3,502,745 | 3/1970 | Minton | 260—881 |
| 3,509,234 | 4/1970 | Burlant | 260—859 |
| 3,528,844 | 9/1970 | Burlant | 117—93.31 |

PAUL LIEBERMAN, Primary Examiner

U.S. Cl. X.R.

260—862, 885